Sept. 2, 1958  M. E. TRUE  2,850,125
FLUID-COOLED BRAKING DEVICE
Filed June 18, 1956

INVENTOR.
Martin E. True,
BY John D. Schneider
ATTORNEY.

2,850,125
Patented Sept. 2, 1958

2,850,125

FLUID-COOLED BRAKING DEVICE

Martin E. True, Houston, Tex., assignor, by mesne assignments, to Jersey Production Research Company Application June 18, 1956, Serial No. 591,871

1 Claim. (Cl. 188—264)

This invention is directed to a brake rim adapted for use in apparatus such as a hoist or drawworks. More particularly, this invention is directed to a brake rim having a replaceable wear surface.

Experience has shown that molded brake blocks can not be used satisfactorily on steel rims. Cast iron, however, has proven an excellent material for brake rims for use with molded brake blocks. Although a solid, ductile cast iron rim provides the theoretical properties required to withstand drawworks brake service, in practice it is difficult to obtain reliable, sound castings which will withstand the severe punishment to which drawworks brakes are exposed. Dangerous brake rim explosions have occurred in the past with cast iron rims.

Present brake rims employed on hoists, drawworks, or similar apparatus are made in one piece, which requires that the drum shaft be removed from the drawworks assembly in order for the one-piece rims to be unbolted and removed whenever replacement is desired.

Hence, one object of this invention is to provide an apparatus which permits replacement of drawworks brake rims or parts thereof without necessitating removal of the drawworks drum.

Another object of this invention resides in employing a brake rim material having desired brake rim properties such as cast iron thereby permitting the use of brake blocks which have desirable coefficient of friction characteristics.

A further object of this invention is to provide an apparatus which permits the use of cast iron or similar material on brake rims in conjunction with a desirable brake lining material thereby eliminating the danger of brake rim explosion.

This invention in brief relates to a braking device for drawworks comprising rotatable inner and outer flanges having a continuous brake rim secured therebetween and a plurality of arcuate sections arranged on the continuous brake rim to form a cylindrical brake rim wear surface. It is also contemplated that a cooling means may be provided for the continuous brake rim, if desired.

Reference will now be made to the drawing wherein identical numerals designate identical parts.

Figure 1:
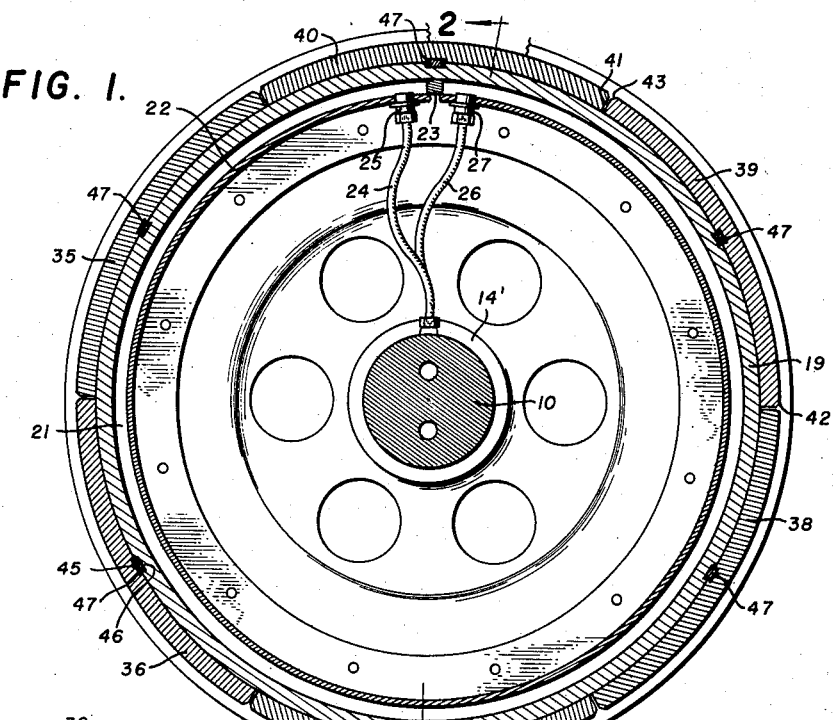
Fig. 1 is an elevational view partly in section of the device of the present invention.
Figure 2:
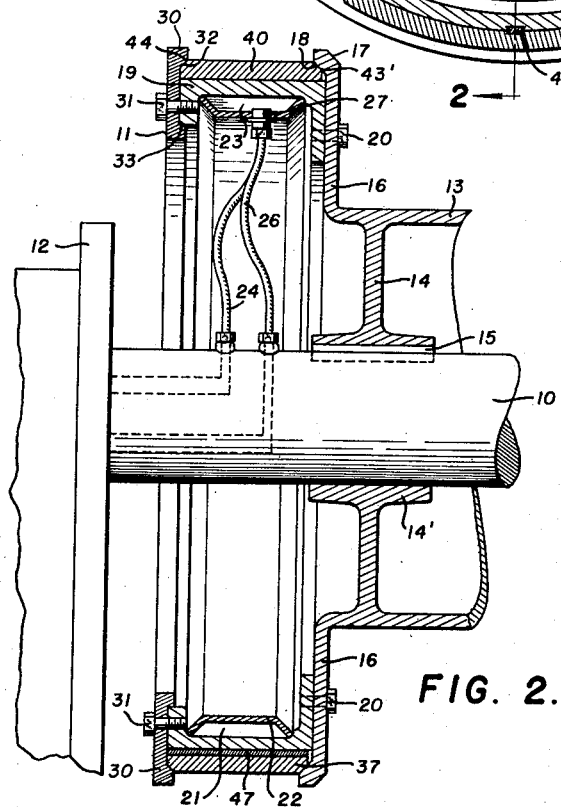
Fig. 2 is a sectional view taken on line 2—2 of Fig. 1 and also illustrates the drive shaft and associated shaft bearing housing.

Figs. 1 and 2 disclose a drive shaft 10 extending through a brake rim assembly generally designated 11 and into a supporting bearing housing indicated at 12. A drum shaft 13 is secured for rotation with drive shaft 10 by means of struts 14 and hub 14' keyed as at 15 to drive shaft 10. A drum flange 16 is formed integral with drum shaft 13 and is provided with an annular lip 17. Lip 17 is provided with a beveled annular supporting surface 18. A continuous cylindrical brake rim 19, which may suitably be made of steel, is secured to drum flange 16 by means of cap screws 20. Brake rim 19 has formed therein an annular chamber 21, the radially inner wall being indicated at 22.

A dam 23 is provided in chamber 21 to close off circumferential fluid communication in chamber 21. As seen more clearly in Fig. 1, a fluid inlet conduit 24 is connected to a port 25 on one side of dam 23 and a fluid outlet conduit 26 is connected to a port 27 on the other side of dam 23. The chamber 21, dam 23, inlet 24 and outlet 26 serve as cooling means for brake rim 19. Fluid, such as water, may be supplied to chamber 21 through conduit 24, circulated through chamber 21 and discharged through conduit 26.

An axially outer cylindrical flange 30 is secured to brake rim 19 by means of cap screws 31. Flange 30 is provided with beveled supporting surface 32 and an axially inwardly extending shoulder portion 33. A plurality of outer wear surfaces 35-40 are arranged on brake rim 19, as seen more clearly in Fig. 1. These sections or segments may be formed of ductile iron, cast iron, steel or any material suitable for brake rim material. A slight amount of clearance, as indicated at 41, may be left between each section in order to compensate for the difference of coefficient of expansion between the material of the rim 19 and the material of the sections 35-40. The leading and trailing radially outward edges 42 and 43, respectively, of the sections are preferably chamfered, as shown, to prevent damage to the brake blocks. As seen more clearly in Fig. 2, the sections are beveled, as at 43' and 44, on each edge so that they may be supported and retained in place by the engaging surfaces 18 and 32 of the drum and outer flanges, respectively.

Figure 3:
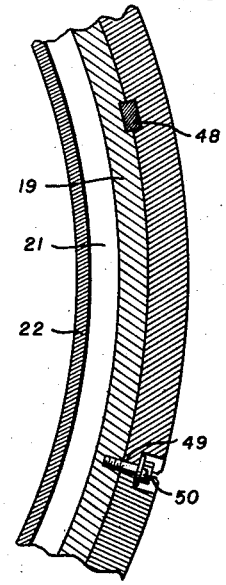
Fig. 3 is a fragmentary sectional view similar to Fig. 1 showing an improved means for securing the outer wear surface sections to the rim.

Keyways formed by indents 45 and 46 are machined in the outer wear surface sections 35-40 and the brake rim 19, respectively. Keys 47 are shown inserted in these keyways. The keys and keyways may be provided to lock the outer wear surfaces 35-40 to the rim 19. Fig. 1 discloses dovetail keyways and in Fig. 3 rectangular keyways 48 are shown. The dovetail keyways prevent relative circumferential movement between the sections 35-40 and the rim 19 and aid in preventing radial movement of the sections. The rectangular or square keyways will only prevent movement of the sections circumferentially. If desired, as shown in Fig. 3, tapped holes may be provided in the sections and the rim, as indicated at 49, in which cap screws 50 are inserted to hold the rim sections and the steel rims in their proper positions and to prevent relative circumferential movement of the rim sections and to restrain the tendency of the sections to move radially under the action of centrifugal force.

In disassembling and assembling the apparatus or in replacing one or all of the outer wear surfaces 35-40, cap screws 31 are removed thereby permitting removal of outer flange 30. Outer flange 30 is then moved away from the rim 19 and sections 35-40. The key 47 is then removed from the outer wear surface section desired to be removed and the outer wear surface section is then removed. Any or all, as noted supra, of the brake rim surfaces may be similarly removed. In assembling the replacement, outer wear surface rim section is arranged in proper position on rim 19 wherein the keyways formed by indents 45 and 46 are aligned and the key 47 (or key 48) inserted. Then, outer flange 30 is replaced and secured to brake rim 19 by means of cap screws 31. If the tapped holes 49 and cap screws 50 of the Fig. 3 modification are provided, the screws 50 are removed and replaced when the keys are removed and replaced as described supra.

As readily seen, if the continuous, non-sectional brake rim 19 required replacement, it would have been necessary to displace the drive shaft from the bearing housing 12 and either remove the drive shaft 10 from the housing or move the rim 19 in an axial direction from over the end of drive shaft 10 after disassembling and removing the bearing housing. In either case, considerable time and effort must be expended in disassembling and assembling the apparatus. This invention eliminates these difficulties by providing a sectional replaceable brake rim surface. This invention also provides means for utilizing the desirable characteristics of brake rim wear surface material with structurally strong brake rims.

Having described the objects, structure and operation of my invention, I claim:

A braking device for drawworks comprising a rotatable drum flange provided with a first annular supporting surface, a removable outer flange provided with a second annular supporting surface, a continuous brake rim secured to said drum flange and outer flange and spaced radially inwardly from said first and second supporting surfaces, a plurality of arcuate sections arranged on said brake rim to form a cylindrical brake rim surface and being removably secured thereto, said sections having axially inner and outer beveled surfaces adapted to engage with said first and second supporting surfaces, respectively, a fluid chamber in said brake rim and means for circulating fluid through said chamber to cool said brake rim.

References Cited in the file of this patent

UNITED STATES PATENTS

| | | |
|---|---|---|
| 425,734 | Birch | Apr. 15, 1890 |
| 696,391 | Cole | Mar. 25, 1902 |
| 1,853,118 | Faulkner | Apr. 12, 1932 |
| 2,038,188 | Morgan | Apr. 21, 1936 |
| 2,362,581 | Newcomb | Nov. 14, 1944 |
| 2,808,134 | Ragland | Oct. 1, 1957 |